United States Patent [19]

Brown, deceased et al.

[11] 4,088,298

[45] May 9, 1978

[54] CHECK VALVE ASSEMBLY

[75] Inventors: Cicero C. Brown, deceased, late of Houston, Tex., by Joe Russell Brown, executor; Ramey Lee Brown, executor, both of Houston, Tex.

[73] Assignee: Brown Oil Tools, Inc., Houston, Tex.

[21] Appl. No.: 663,902

[22] Filed: Mar. 4, 1976

Related U.S. Application Data

[62] Division of Ser. No. 495,874, Aug. 8, 1974, abandoned, which is a division of Ser. No. 322,217, Jan. 9, 1973, Pat. No. 3,850,194.

[51] Int. Cl.² ............................................. F16K 15/18
[52] U.S. Cl. ................................ 251/149.8; 137/68 R; 166/334; 175/318; 251/348
[58] Field of Search ................... 137/68 R; 251/149.8, 251/348; 166/317, 334; 175/318

[56] References Cited

U.S. PATENT DOCUMENTS

| | | | |
|---|---|---|---|
| 2,563,515 | 8/1951 | Brown | 175/318 |
| 2,944,793 | 7/1960 | Conrad | 251/348 X |
| 3,151,839 | 10/1964 | Mott | 166/334 X |
| 3,233,677 | 2/1966 | Myers | 166/334 X |

*Primary Examiner*—Alan Cohan
*Assistant Examiner*—Gerald A. Michalsky

*Attorney, Agent, or Firm*—Browning, Bushman & Zamecki

[57] ABSTRACT

A check valve assembly for permitting unrestricted flow in one direction and limited flow in the reverse direction comprising: a valve body having a longitudinal flowbore therethrough; a seat member carried by the valve body; a closure member carried by the valve body for movement from a normally open position, in which flow through the flowbore is unrestricted, to a closed position engaging the seat member, in which reverse flow through the valve body is prevented; and a reciprocal sleeve member carried by the valve body for movement between a first position, preventing movement of the closure member to its closed position, to a second position, allowing movement of the closure member to its closed position. The sleeve member may be provided with an annular pressure surface in fluid communication with the exterior of the valve body for applying a force to move the sleeve member from the first position to the second position in response to a greater pressure externally of the valve body than the pressure within the flowbore. In other embodiments the sleeve member may be attached to a first body portion of the valve body which telescopically engages a second body portion for limited axial movement relative thereto. In such an embodiment the sleeve member is movable from its first to its second position in response to limited axial movement of the first body portion.

6 Claims, 14 Drawing Figures

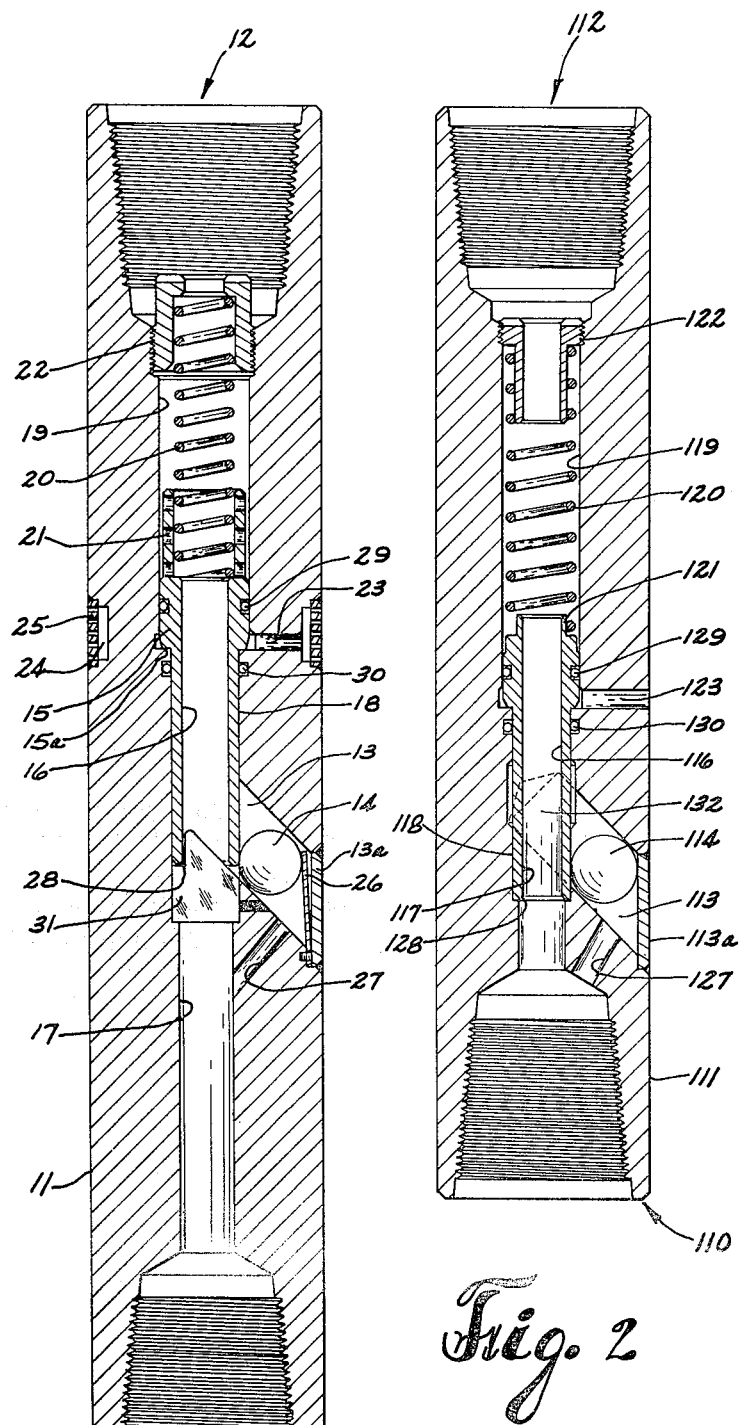

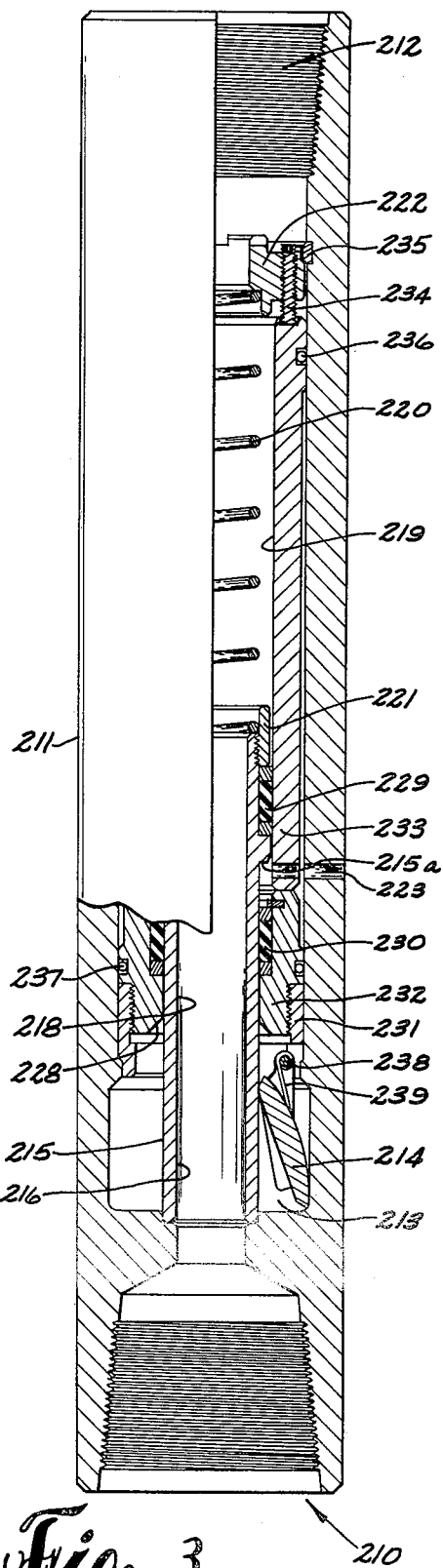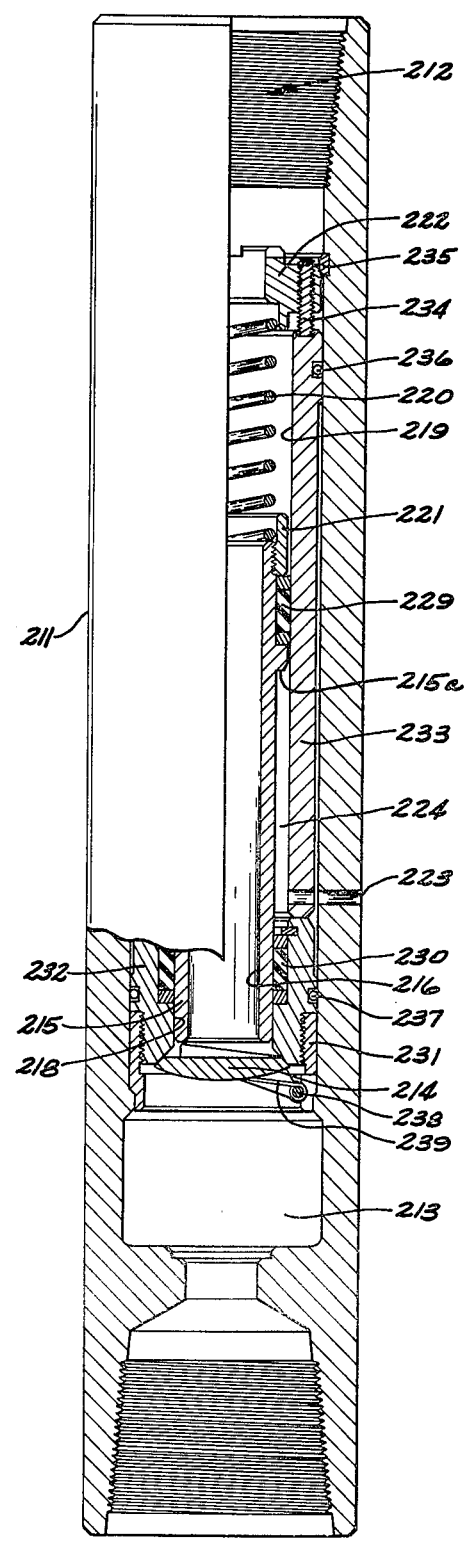

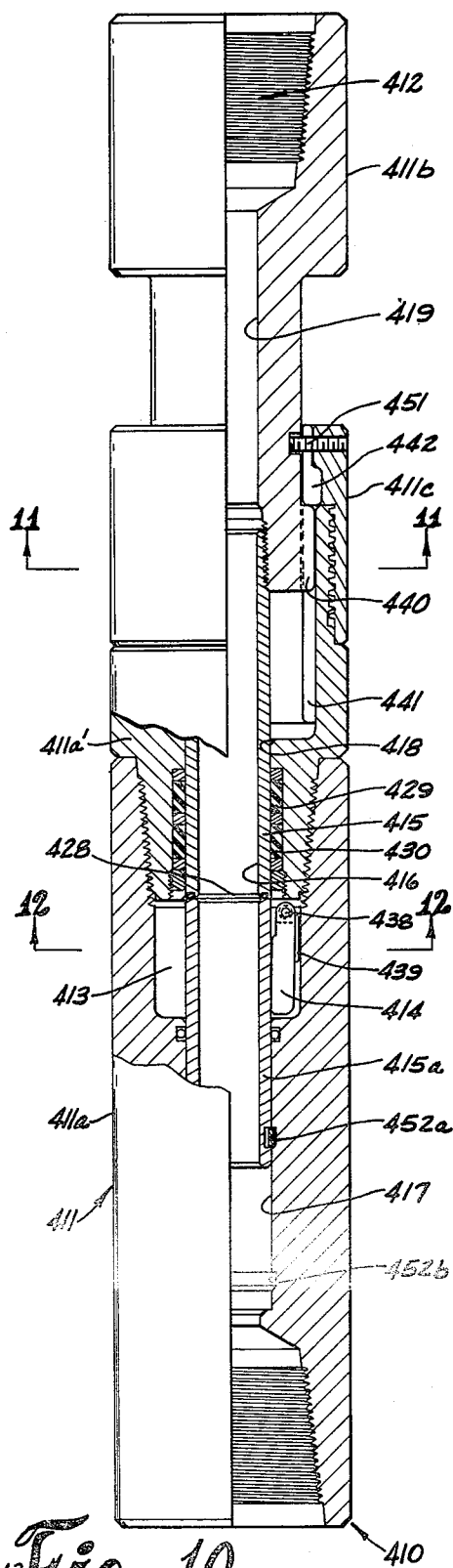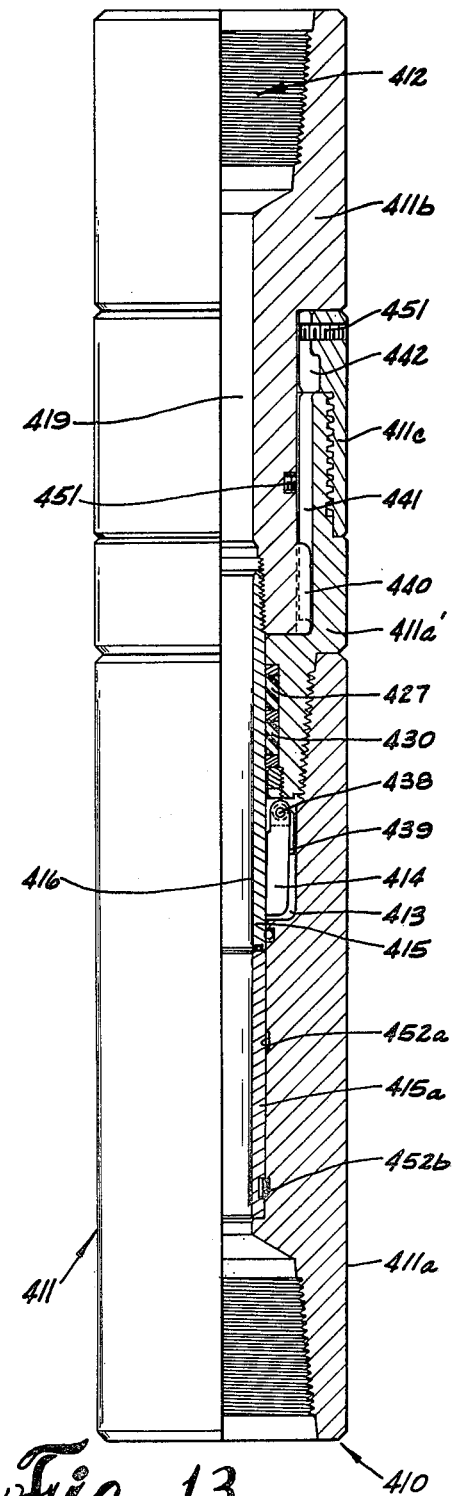

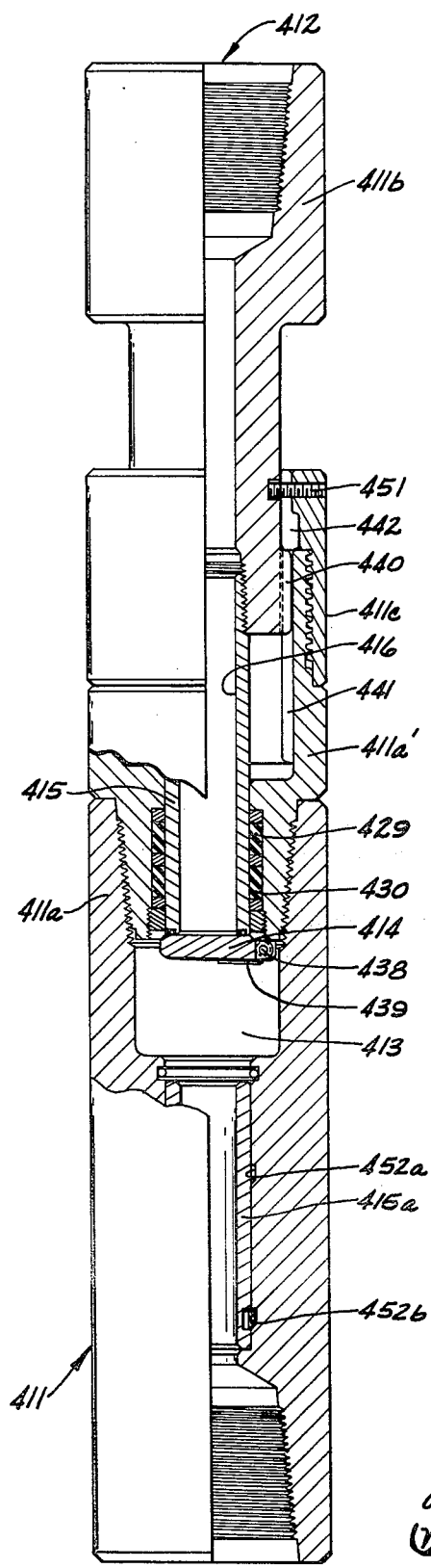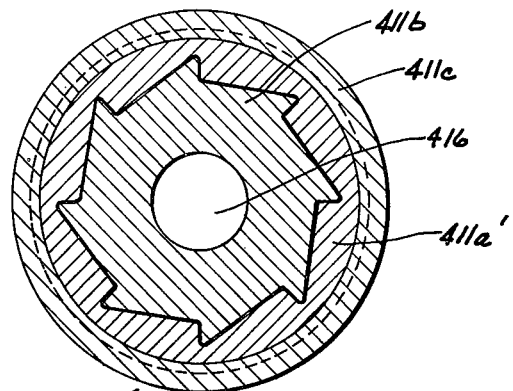
Fig. 11
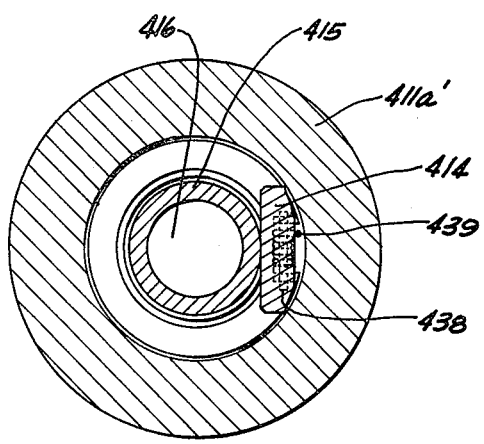
Fig. 12
Fig. 14

CHECK VALVE ASSEMBLY

This is a division of application Ser. No. 495,874, filed Aug. 8, 1974 and abandoned, which was a division of application Ser. No. 322,217, filed Jan. 9, 1973 and issued Nov. 26, 1974 as U.S. Pat. No. 3,850,194.

BACKGROUND OF THE INVENTION

1. Field of the Invention

The present invention relates to means for preventing reverse fluid flow through pipe. More specifically, the present invention relates to a check valve assembly suitable for employment in a drill string in which drilling fluid or "mud" is pumped downwardly through the string. The assembly is designed to prevent upward flow of the drilling fluid when the drill bit enters a high pressure area.

2. Description of the Prior Art

During the drilling of a well, there may arise a need for preventing the uncontrolled upward flow of drilling fluid or "mud" in the drill string, should the drill bit enter a high pressure area. Under normal operating conditions, unrestricted downward flow of the mud is desired. The prior art has suggested a number of check valve assemblies designed to allow fluids or fluent materials to be pumped downwardly through a drill string but to prevent reverse or upward flow therethrough. See, for example, U.S. Pat. Nos. 1,577,740 and 1,790,480.

If the valve elements of a check valve device are directly in the flow stream, the materials pumped through the drill string may erosively wear the valve components, particularly when such materials carry abrasive particles. Most check valve devices of the prior art employ a closure and seat assembly which is located directly in the flow stream and, therefore, subject to the erosive action of abrasive material in the fluid. Such valves, restrict the downward flow of fluid and, with the closure and seat assembly located directly in the flowstream, it is impossible for equipment to be lowered through the drill string past the assembly.

Furthermore, during drilling operations, the drill string must occasionally be removed from the well bore for maintenance of the drill bit. Any check valve device employed in the drill string should allow fluid to empty from the drill string as it is raised from the well bore. It is also preferable that the check valve device allow at least some reverse fluid flow through the drill string as it is being lowered into the well bore. This allows the drill string to be filled from the bottom so that fluid does not have to be pumped into the drill string from the surface to prevent collapsing because of pressure differentials. Valve assemblies of the prior art either allow no reverse fluid flow or a predetermined amount of reverse flow at all times. A valve that allows a predetermined amount of reverse flow at all times works fine when the drill string is lowered into the well bore; but, when the drill bit enters a high pressure area, it is impossible to completely stop flow.

Other devices, not designed for use in a drill string, have been developed to control only the upward flow of fluid in tubing. These devices are used in production strings to shut off the flow of oil or gas when damage occurs to equipment at the wellhead. See, for example, U.S. Pat. Nos. 3,269,463; 3,332,497; 3,332,498; 3,411,585; 3,568,768; 3,584,645; and 3,662,824.

SUMMARY OF THE INVENTION

The present invention provides a new and improved drill string check valve assembly, with an unrestricted flow path, which allows unrestricted flow in one direction and passage of flowline equipment; but, which is provided with a means for preventing reverse flow when a high pressure area is encountered in the well bore. In a preferred form of the invention a valve body is provided with a longitudinal flowbore therethrough. The valve body carries a seat member and a closure member movable from a normally open position, in which flow through the flowbore is unrestricted, to a closed position engaging the seat member within the flowbore, in which reverse flow through the valve body is prevented. The valve body also carries a reciprocal sleeve member for movement from a first position, preventing movement of the closure member from its open position, to a second position, allowing movement of the closure member to its closed position.

The sleeve member may be provided with an annular pressure surface and fluid communication with the exterior of the valve body for applying a force to move the sleeve member from its first position to its second position in response to a greater pressure externally of the valve body than the pressure within the flowbore. In another embodiment, the valve body may comprise a first body portion telescopically engaging a second body portion for limited axial movement relative thereto. In this embodiment, the sleeve member may be attached to the first body portion and responsive to limited axial movement from its first and second positions.

One advantage of the present invention is the fact that under normal operating conditions, with the valve closure member in the open position, the flow bore is unrestricted and the closure member is protected from erosion by abrasive materials in the drilling fluids. However, when a high pressure section of the well bore is encountered, the closure member may be moved to its closed position blocking reverse flow through the check valve assembly and providing complete control of the well.

Another advantage of the present invention is its simplicity of design and construction. No special machining or castings are required as in previous designs. Furthermore, the design is such that the assembly doesn't have to be completely removed from the drill string when maintenance is required.

The foregoing and other features and advantages of the present invention will be more fully understood from the following specification, claims and the related drawings.

BRIEF DESCRIPTION OF THE DRAWINGS

FIG. 1 is a vertical cross-sectional elevation illustrating a preferred embodiment of the check valve assembly of the present invention showing the assembly in an open position;

FIG. 2 is a vertical cross-sectional elevation illustrating an alternate embodiment of the check valve assembly of the present invention in an open position;

FIG. 3 is a vertical elevation, partially in section, illustrating another alternate embodiment of the check valve assembly of the present invention in the open position;

FIG. 4 is a view similar to FIG. 2, illustrating the check valve assembly in a closed position;

FIG. 10 is a vertical elevation, partially in section, of still another alternate embodiment of the check valve assembly of the present invention shown in the open position;

FIG. 11 is a horizontal cross-section, taken along line 11—11 of FIG. 10, illustrating the construction of the spline shaft employed in the check valve assembly of FIG. 10;

FIG. 12 is a horizontal cross-section, taken along line 12—12 of FIG. 10, illustrating the flapper valve in the open position;

FIG. 13 is a view, similar to FIG. 10, illustrating the check valve assembly in the normal drilling position; and FIG. 14 is a view, similar to FIGS. 10 and 14, illustrating the check valve assembly in the closed position.

DESCRIPTION OF PREFERRED EMBODIMENTS

Figure 5:
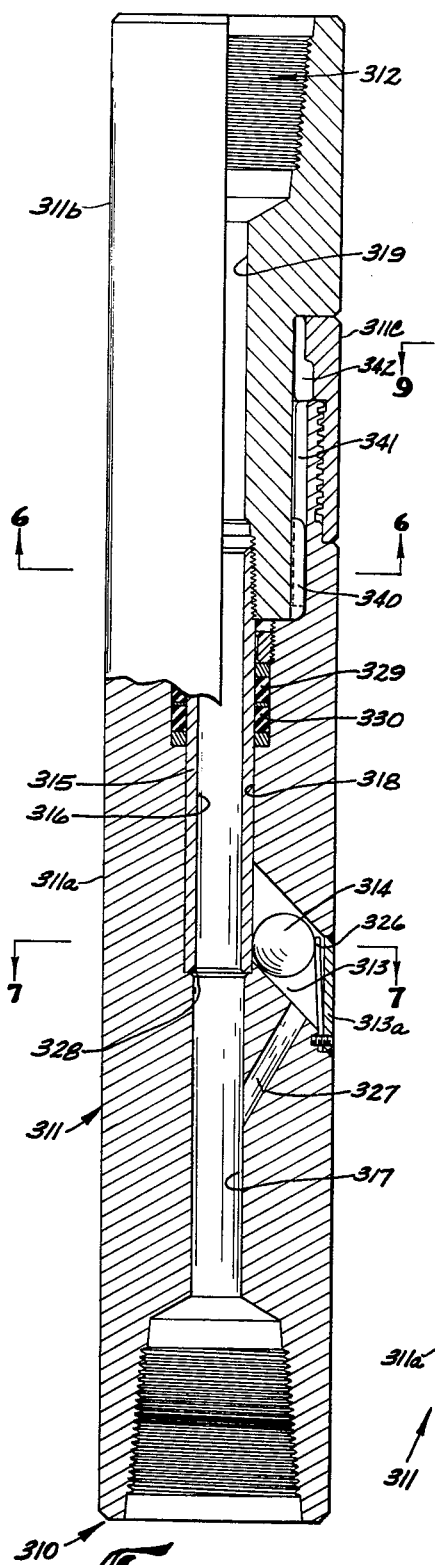
FIG. 5 is a vertical elevation, partially in section, illustrating another alternate embodiment of the check valve assembly of the present invention in the open position.

In the drawings, FIG. 1 illustrates details in the construction of a preferred embodiment of the present invention, a drill string check valve assembly indicated generally at 10. The assembly 10 comprises a cylindrical valve body 11 having a longitudinal central flowbore 12, an inclined ball recess 13, with a suitable cover plate 13a, a ball closure member 14 and a slidable inner tubular sleeve 15, which has a longitudinal bore 16. The central flowbore 12 may be divided into three sections; a small diameter lower bore 17, an intermediate bore 18, and an enlarged upper bore 19. It is desired that the diameter of the sleeve bore 16 be equal to the diameter of the bore 17 so that the bore 16 does not restrict the flow of fluid.

During normal drilling operations, the ball closure 14 is located in the recess 13 and is retained there by the sleeve 15 which is in a first or lower position, as illustrated. The sleeve 15 is biased toward its lower position by a helical compression spring 20 which is axially aligned with the bore 19 and retained therein by a collar 21 formed on the sleeve 15 and by a threaded spring retainer 22 located at the upper end of the bore 19. With the sleeve 15 in the first or lower position, drilling fluid is allowed to flow, unrestricted, through the assembly 10.

When in use, the assembly 10 is threadedly attached to a string of drill pipe, preferably near the drill bit, and is used to prevent "blowouts" or reverse flow which can occur when the pressure in the well bore is greater than the pressure in the flowbore 12 of the assembly 10.

Communication is provided between the well bore and an annular pressure surface 15a on sleeve 15 by a radial port 23. An annular recess 24 allows even distribution of the fluid or gas from the well bore. A screen 25 encircles the annular recess 24 preventing large particles of rock or other material from entering the bore 23 and interfering with the operation of the sleeve 15. If the pressure in the well bore is sufficiently greater than the pressure in the bore 12 to overcome the tension of the spring 20, the sleeve 15 will move axially upward, to a second position, allowing the ball 14 to be displaced from the recess by a leaf spring 26, and by the upward flow of fluid, through a pressure equalizing passage, which communicates with the flowbore 12 downstream of sleeve 15.

When the sleeve is in its second or upper position, an annular seating surface 28 is exposed. The reverse flow of fluid is stopped, when the ball 14 contacts the seating surface 28. Suitable seals 29 and 30 are provided to prevent leakage of fluid past the sleeve 15. In the illustrated form of the invention the seals 29 and 30 are resilient O-rings.

When the pressure above the ball 14 becomes as great as the pressure in the well bore, the force exerted by the fluid, gravity and the tension of the spring 20 will cause the ball 14 to drop down the bore 18 and be guided into the recess 13 by a deflector 31. The ball 14 will be maintained, in this open position, by sleeve 15 until another high pressure section of the well bore is encountered. When the ball 14 has returned to the recess 13, the drilling process can be resumed.

FIG. 2 illustrates another form of the drill string check valve assembly indicated generally at 110. The construction and operation of the assembly 110 is basically the same as that of the assembly 10 in FIG. 1. Therefore, to avoid repetition of the description, the reference numbers for similar components in the assembly 110 have "100" added to the reference number of corresponding components in the assembly 10.

The basic difference in the assembly 110 is that the inclined ball recess 113 is projected into the bore 118, by drilling, to form a ball return guide 132. This eliminates the necessity of a deflector, such as deflector 31 of FIG. 1. In addition, the sleeve collar 121 and spring retainer 122 engage the spring 120 internally rather than externally, as in FIG. 1.

Another modification of the invention, indicated generally at 210 is shown in FIG. 3. The assembly is referenced to the specifications of FIG. 1 by adding "200" to the reference numbers of corresponding components of the assembly 10. The principle of operation of the assembly 210 is basically the same as that of the assembly 10 illustrated in FIG. 1. The primary difference is that to achieve the same results, assembly 210 uses a flapper closure member 214 instead of a ball closure member 14 as in assembly 10 of FIG. 1. It will also be appreciated that the flapper valve 214 and the sliding sleeve 215 are contained in a removable assembly.

The removable assembly, disposed in the bore 212 consists of: a collar 231, to which the flapper 214 is pivotally attached by a pin 238, having a spring 239 to force the flapper 214 out of the chamber 213; a first outer sleeve 232, which is threadedly secured to the collar 231; and a second outer sleeve 233, located axially above the first sleeve 232 to maintain correct positioning of the first sleeve 232, and having a bore 219, which allows reciprocal movement of the slidable sleeve 215.

The sleeve 215 is biased toward its first or lower position by the spring 220. An adjustable spring retainer 222 may be connected to the sleeve 233 by a screw 234. A circular snap ring 235 may be employed to prevent the spring retainer 222 from moving out of the valve body 211. Suitable sealing means are provided in the form of resilient O-rings 236 and 237 to prevent the leakage of fluid past the removable assembly. Seals 229 and 230 provide a sliding seal between sleeve 215 and the outer sleeves.

As in the previously described embodiments, a port 223 provides fluid communication between the well bore and an expandable chamber 224 so that pressure may be applied to an annular pressure surface 215a on sleeve 215. When the pressure in the well bore exceeds the pressure in flowbore 212, such as would occur when the drill bit enters a high pressure area, the sleeve 215 would be forced upwardly to a second or upper position, allowing flapper 214 to seat against valve seat 228, blocking reverse flow through the check valve 210.

Referring now to FIG. 5, still another modification of the drill string check valve assembly is indicated generally at 310. The assembly 310 is similar in construction to the assembly 10 illustrated in FIG. 1; therefore, components of the assembly 310 can be referenced to corresponding components of the assembly 10 in FIG. 1 by adding "300". All of the embodiments of the invention, described herein, are designed to stop the reverse flow of fluid. However, the assemblies of FIGS. 1-4 are responsive to pressure whereas the assembly 310 of FIG. 5 is responsive to axial displacement of a portion of assembly 310 by lifting the drillstring to which it is attached.

The assembly 310 comprises a cylindrical valve body 311 having longitudinal flowbore 312. The body 311 may have a first or upper portion 311b, telescopically engaging a second or lower portion 311a which is retained for limited axial movement by a collar 311c. The slidable sleeve 315 is threadedly secured to the upper body portion 311b and during normal drilling operations, is in its first or lower position, as illustrated in FIG. 5.

Figure 6:
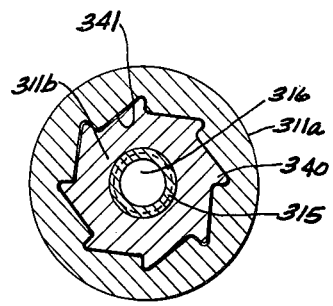
FIG. 6 is a horizontal cross section, taken along line 6—6 of FIG. 5 illustrating the construction of the spline shaft employed in the check valve assembly of FIG. 5.

To transfer rotary force or torque from the drill string to a drill bit (not shown) the upper body portion 311b may be equipped with male spline elements 340 cooperating with female spline elements 341 in lower body portion 311a. Thus, a torque may be transferred from upper portion 311b to lower portion 311a throughout their axial displacement. Greater detail of the spline arrangement is illustrated in FIG. 6.

Figure 8:
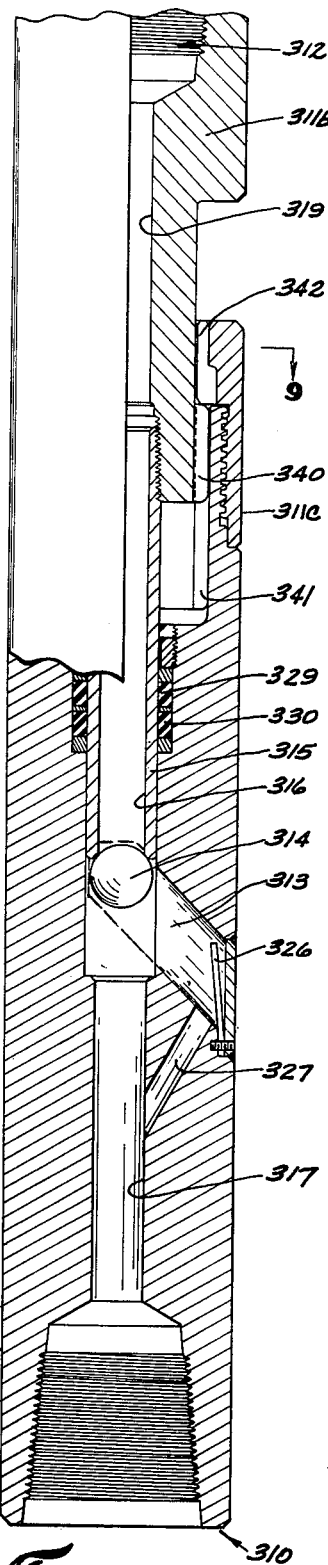
FIG. 8 is a view, similar to FIG. 5, illustrating the check valve assembly in the closed position.
Figure 9:
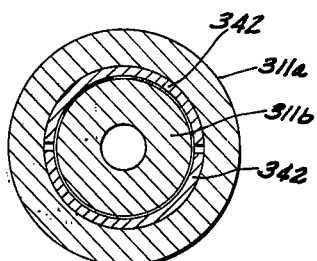
FIG. 9 is a horizontal cross-section, taken along line 9—9 of FIG. 8, illustrating the split ring retainer employed in a check valve assembly of the present invention.

When the drill string (not shown) is raised, as best illustrated in FIG. 8, the upper body portion 311b will slide axially upward until the upper edge of the male spline elements 340 contact a split ring 342 in the collar 311c. The split ring 342 is employed to allow replacement of body portion 311b. FIG. 9 illustrates details of the split ring 342.

With the body 311b in its upper position, the sleeve 315 is also in its second or upper position which will allow the ball 314 to be displaced from the recess 313 by the reverse flow of fluid. The ball 314 will then contact the seating surface 328 of the sleeve 315 thereby stopping the reverse fluid flow.

Figure 7:
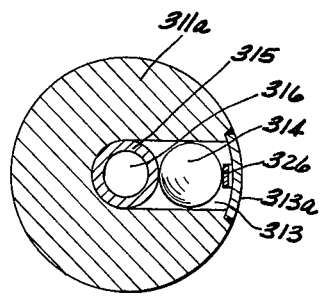
FIG. 7 is a horizontal cross section, taken along line 7—7 of FIG. 5, illustrating the positioning of the ball in the recess of the check valve assembly of FIG. 5.

When the drill string is lowered back into the well bore, and if the pressure in the drill string is greater than the pressure in the well bore, the ball 314 will return to the recess 313 and drilling operation can resume. Subsequent lowering of the drill string and, consequently, sleeve 315 will retain the ball 314 in the recess 313 as illustrated in FIGS. 5 and 7.

Another modification of the drill string check valve assembly is generally indicated at 410 in FIG. 10. It is a further modification of the assembly 310 illustrated in FIGS. 5-9 and can be referred to the specification of the assembly 310 by adding "100" to the reference characters of corresponding components in FIGS. 5-9.

The assembly 410 employs a flapper closure member 414 instead of the ball valve 314, as in FIG. 5, for preventing reverse flow of fluid. An enlarged chamber 413 is provided in the lower body portion 411a to receive the flapper 414 in its open position. The flapper 414 is pivotally attached to a coupling 411a'. The coupling 411a' is threadedly fastened to and becomes a part of lower body portion 411a.

When the assembly 410 is lowered into a well bore, the flapper 414 is retained in the chamber 413 by a lower sleeve 415a. The upper body section 411b is held in its upper position by a shear pin 451. After reaching the bottom of the well, the pin 451 is sheared by the weight of the drill string and the body portion 411b and sleeve 415 drop downwardly, forcing a snap ring on a sleeve 415a to disengage an upper snap ring groove 452a and to engage a lower snap ring groove 452b in the bore 417, as best illustrated in FIG. 13.

With references to FIG. 14, when the drill string is lifted in the well bore, the upper body 411b and sleeve 415 are moved upwardly, to a second position, allowing the flapper 414 to contact the seating surface 428 on the sleeve 415 since sleeve 415a is locked in place by the snap ring 452b. In this position, no fluid is allowed to flow up the drill string.

As in the embodiment of FIGS. 5-9, the assembly of FIGS. 10-14 is provided with male and female spline elements 440 and 441, respectively, to permit transfer of torque from upper body portion 411b to lower body portion 411a. Details of the spline elements are best seen in FIG. 11.

The foregoing description has disclosed a number of embodiments of a unique check valve assembly for control of reverse flow. The assembly of the invention permits unobstructed normal flow, yet allows control of reverse flow when high back pressures are encountered. However, it still permits some reverse flow when it is desired. For example, when a drill string is being lowered into a well bore. Although several embodiments of the invention have been described herein, the invention is not so limited. Various changes in the size, shape and materials of the invention, as well as in the details of construction, may be made within the scope of the appended claims without departing from the spirit of the invention.

I claim:

1. A check valve assembly for permitting unrestricted flow in one direction and limited flow in the reverse direction comprising:

(a) a valve body having a longitudinal flowbore therethrough and including a first body portion telescopically engaging a second body portion for limited axial movement relative thereto;

(b) seat means carried by said valve body within said flowbore;

(c) closure means, comprising a flapper member, pivotally mounted within said valve body for pivotal movement from a normally open position in which flow through said flowbore is unrestricted, to a closed position, engaging said seat means, in which reverse flow through said valve body is prevented; and (d) sleeve means carried by said valve body and including a first sleeve member, connected to said first body portion and responsive to said limited axial movement for movement between a first configuration, preventing movement of said closure means from said open position, and a second configuration, allowing movement of said closure means to said closed position, and a second sleeve member engageable with said first sleeve member, said second sleeve member being moveable, upon movement of said first body portion from an extended to a retracted position, from a first position, in which said second sleeve member prevents movement of said closure means from said open position, to a second position in which said second sleeve member does not prevent movement of said closure means.

2. A check valve assembly as set forth in claim 1 including connection means connecting said first and second body portions in said extended position, said connection means being releasable upon the application of a predetermined axial force to permit axial movement of said first body portion to said retracted position.

3. A check valve assembly as set forth in claim 1 in which said first and second body portions are provided with mutually engageable, longitudinal male and female spline portions for transferring a torque applied to one body portion to the other throughout said limited axial movement.

4. A check valve assembly as set forth in claim 1 in which said seat means comprises an annular seating surface carried by said sleeve means.

5. A check valve assembly as set forth in claim 1 including biasing means carried within said valve body, biasing said flapper member toward said closed position.

6. A check valve assembly as set forth in claim 1 wherein said second sleeve member is provided with latch means for locking said second sleeve member in said second position.

* * * * *